United States Patent [19]

Dorleans

[11] Patent Number: 4,675,792

[45] Date of Patent: Jun. 23, 1987

[54] HEADLIGHT AND PROCESSES FOR MAKING SAME

[75] Inventor: Guy Dorleans, Boulogne, France

[73] Assignee: Cibie Projecteurs, Bobigny, France

[21] Appl. No.: 615,054

[22] Filed: May 29, 1984

[30] Foreign Application Priority Data

Jun. 1, 1983 [FR] France ................................ 83 09065

[51] Int. Cl.[4] ................................................ B60Q 1/00

[52] U.S. Cl. ......................................... 362/61; 362/83; 362/307; 362/351; 313/113; 445/3; 445/4

[58] Field of Search .................... 362/61, 83, 257, 267, 362/296, 307, 310, 311, 317, 351, 374, 375, 362, 350; 313/113; 445/3, 4, 23, 27, 44

[56] References Cited

U.S. PATENT DOCUMENTS 2,890,920 6/1959 Falge ........................................ 445/4
3,625,796 12/1971 Graves ................................ 313/113
3,899,812 8/1975 Baranski et al. ...................... 445/30
3,962,765 6/1976 Stachel et al. .......................... 445/4
4,124,883 11/1978 Lilley ................................. 362/350
4,249,232 2/1981 Dick ...................................... 362/61
4,447,862 5/1984 Shanks ............................... 313/113

*Primary Examiner*—Craig R. Feinberg

[57] ABSTRACT

The present invention relates to a headlight comprising a glass lens element and a support element, such as a reflector, of thermoplastic material, such elements being associated at their periphery by matching assembly shapes of interlocking type which are fixed by an assembly glue. The headlight is characterized in that the lens is provided with three fixed internal supports cast in one piece with the lens which define a bearing plane. The lens is also provided with a further internal support having a positive offset with respect to the bearing plane. This offset is compensated by an interposed support member whose thickness is determined by the actual features of the lens.

2 Claims, 2 Drawing Figures

HEADLIGHT AND PROCESSES FOR MAKING SAME

FIELD OF THE INVENTION

The invention relates to headlights, more particularly motor vehicle headlights.

It relates more particularly to a headlight of the glued lens type and processes for its assembly.

BACKGROUND OF THE INVENTION

The headlight according to the invention comprises a glass lens element and a support element made of plastics material, the two elements being associated at their periphery by matching assembly shapes of the interlocking type, fixed by an assembly glue which is preferably an epoxy resin or a plastisol.

The peripheral assembly shapes aforesaid can be edges, flanges, grooves, etc., and can be produced either in the lens element or in the support element of thermoplastic material.

The term "support element" as used in the present context means the element supporting the lens—i.e., either the reflector, or the extension tube, or the headlight casing.

It will be remembered that the reflector is the element of the headllight which is adapted to be equipped with at least one bulb co-operating optically with the reflector to send back the rays of light emitted by the bulb.

The extension tube means an intermediate, sleeve-shaped element, one of whose ends is attached to the reflector, the other end being attached to the lens. Such an element is used to lengthen the reflector, more particularly in the case of inclined lenses.

The casing means a receptacle to the opening of which the lens is attached and inside which a movable reflector is mounted, this kind of headlight enabling the height of the light beam to be adjusted by varying the inclination of the reflector.

With the development of plastics materials, support elements, more particularly reflectors, can now be moulded in thermoplastic material, for example, polyamide or polybutadiene terephthalate (PBT), such supports having the same properties as the conventional metal support elements. This is more particularly the case with thermoplastic reflectors, which have the same optical properties as the prior art metal reflectors.

The glue used for assembling the two elements sets as a result of curing at an appropriate temperature, of the order of 140° to 150° C.; this temperature must be lower than the softening temperature of the thermoplastic material under the influence of a slight stress. By way of example, the curing can be carried out at 140° C. for a softening temperature under the influence of a slight stress of the thermoplastic material 150° C.

The curing is generally performed by passing the two elements to be glued through a heating tunnel for about half an hour, the lens being disposed above the support element. On termination of the curing, the thermoplastic support element tends to flow as a result of its own weight and to become deformed and apply itself to the supporting surface offered by the lens.

The mass production of glass lenses prevents all the lenses from having a perfectly flat support surface. Consequently the support element may tend to become deformed, more particularly to become twisted, and this may have troublesome consequences for a reflector.

To obviate these disadvantages the Applicants propose to make the lens with internal supports cast in one piece with the lens and offering a true supporting plane. However, since at least four internal supports are required to provide an adequate bearing for the support element, it seems impossible to consistently make the four supports perfectly coplanar.

A first method which might be envisaged would be to provide three fixed internal supports defining a reference bearing plane and at least one deliberately "too long" extra support which would then be ground to the required size in relation to the dimensions of the lens. In practice it would suffice for such extra support to have a surplus dimension of 1.5 mm. Although this method is quite workable, it nevertheless has the disadvantage of requiring the grinding of the, or each extra support and the washing of the lens to get rid of the grinding dust.

SUMMARY OF THE INVENTION

According to the method adopted by the Applicants, the lens has three fixed internal supports cast in one piece with the lens which define a bearing plane substantially parallel with the plane of installation defined by the periphery of the lens, which has at least one extra support having a positive offset with respect to the bearing plane, such offset being compensated by an interposed support member whose thickness is determined as a function of the actual features of the lens.

In a first embodiment of the invention the interposed support member is selected from a set of members of different thicknesses in dependence on the offset measured.

The interposed support member can be attached to the support element, for example, by gluing, clipping or tenon fitting.

In a second embodiment of the invention the interposed support member is made of a material which will flow under the influence of temperature and spontaneously assume the required thickness. The flowable support member can be connected to the support element, for example, by gluing, clipping or tenon fitting.

In a third embodiment of the invention, the interposed support member takes the form of a nipple which is moulded in one piece with the support element and brought to the required thickness either by crushing with ultrasonics or by the application of a hot plate or by automatic machining.

In the process for assembling the headlight according to the first embodiment of the invention, the lens is applied to a mounting corresponding to the shape of the support element, so that the three fixed internal supports are applied to the mounting, the offset between the extra support and the bearing plane is measured, an interposed support member is selected which has a thickness corresponding to the offset measured, the interposed support member is attached to the support element, and then gluing is carried out in knonw manner by the application of glue and curing at the appropriate temperature.

In the process of assembling the headlight according to the second embodiment of the invention the interposed support member is attached to the support element and then gluing is performed in known manner by the application of glue and curing at the appropriate temperature, the curing temperature being higher than the softening temperature under the influence of a slight stress of the material forming the interposed support member.

In the process of assembling the headlight according to the third embodiment of the invention, the lens is applied to a mounting corresponding to the shape of the support element so that the three fixed internal supports are applied to the mounting, the excess thickness of the nipple forming the interposed support member is measured, the nipple is brought to the required thickness, and then gluing is performed in a known manner by the application of glue and curing at the appropriate temperature. The nipple can be brought to the required thickness either by crushing with ultrasonics or by the application of a hot plate or by automatic machining.

BRIEF DESCRIPTION OF THE DRAWING

Other features and advantages of the invention will be more clearly understood from the following description, with reference to the accompanying drawings in which.

DETAILED DESCRIPTION OF THE PREFERRED EMBODIMENTS

Figure 1:
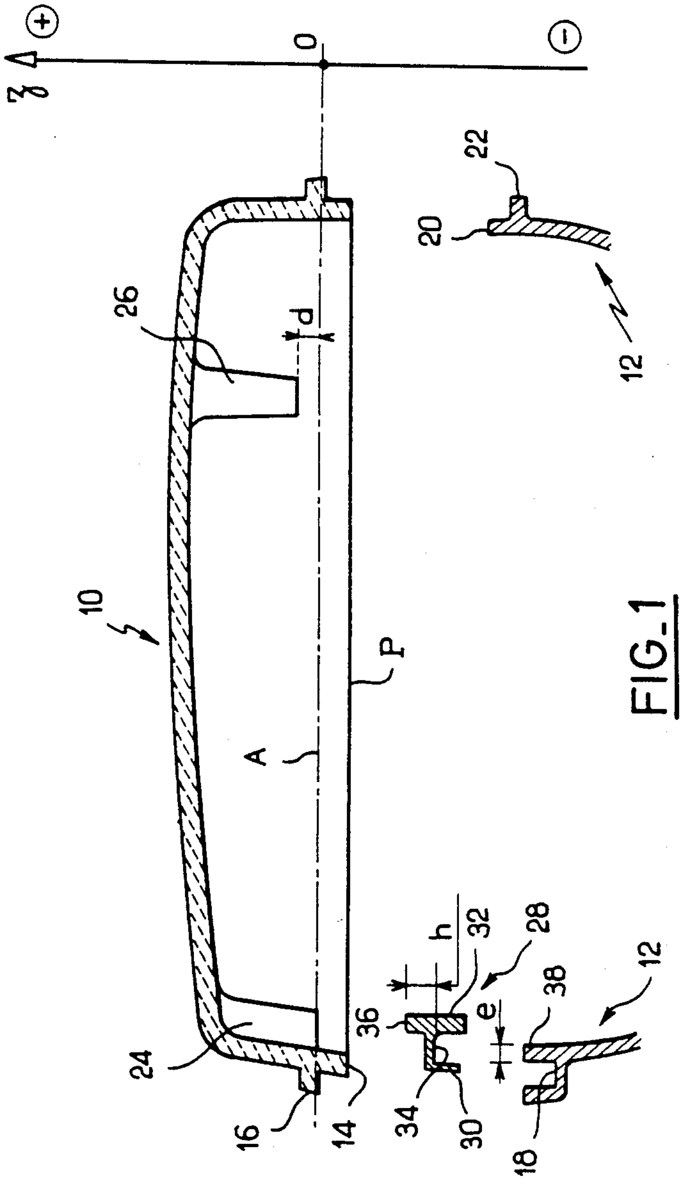
FIG. 1 is a partially sectioned view of a headlight according to the invention.

FIG. 1 shows a headlight comprising a glass lens element 10 and a support element 12, such as a reflector, an extension tube or a casing. The two elements 10 and 12 are adapted to be joined at their respective periphery by matching assembly shapes of the interlocking type.

In the particular embodiment illustrated in FIG. 1 the lens 10 comprises a peripheral edge 14 which defines an installation plane P and a peripheral flange 16 substantially parallel with the installation plane P.

The support element 12 is formed with a peripheral groove 18 adapted to receive the edge 14, the flange 16 bearing against the inlet to the groove. As a variant, the support element 12 can comprise, as shown on the right-hand side of FIG. 1, an edge 20 and a flange 22 adapted to co-operate with matching assembly shapes provided on the lens 10.

According to the invention, the lens 10 is provided with three fixed internal supports 24 (only one of which is shown in FIG. 1) which define a support plane A parallel with the installation plane P. In relation to the support plane A, we can define an axis Oz perpendicular to such plane, the axis being so oriented that the lens turns its concavity towards the negative zs.

According to the invention the lens is also provided with an extra support 26 having a positive offset d in relation to the support plane A. The positive nature of the offset refers to the aforementioned axis Oz.

The three fixed supports 24 and the extra support 26 are so constructed that they are distributed uniformly in relation to the periphery of the lens.

Having regard to the variations in size of mass produced lenses, the offset d will vary from one lens to another, but will always be positive. The invention therefore provides for compensating such offset by an interposed support member 28 whose thickness h will be determined in relation to the actual features of the lens in question—i.e., the value of the offset d. As shown in FIG. 1, the member 28 has, in section, substantially the shape of a small h and comprises a short upright 30 and a longer upright 32 defining therebetween a groove 34. The member 28 is adapted to be applied to the groove 18 so that the top 36 of the upright 32 provides a bearing for extra support 26. The thickness h therefore represents the variation in height between the bottom of the groove 34 and the top 36 of the upright 32.

In the first embodiment the interposed support member is selected from a set of members of different thicknesses in relation to the offset d measured.

To measure the offset, the lens is applied to a mounting corresponding to the shape of the support element, so that the three fixed internal supports are applied to the mounting, whereafter the offset between the support 26 and the bearing plane A is measured by a suitable device, for example, a potentiometric sensor bearing against the fourth support. Then the height of such support can be displayed on a table, rounded off to the value closest to those offered by the aforementioned set of members. By way of example, there may be a set of 15 members having thicknesses lying between 1/10 mm and 1.5 mm, spaced out at intervals of 1/10 mm. The displayed offset value rounded off to the nearest 1/10 mm enables the operator to select from amongst 10 interposed support members that member whose thickness h corresponds to the displayed value.

The member 28 can be clipped onto—i.e., simply fitted onto the support element 12, or glued in a few seconds by a drop of cyanoacrylate type glue, or else tenon fitted. For this last variant, it is enough to provide the member with a tenon which will be inserted into a hole moulded together with the support element, in line with the extra support.

As shown by FIG. 1, the inner edge 38 of the support element 12 has a thickness e which gives a slight clamping ensuring that the support member 28 will be retained until the completion of gluing, as will be explained hereinafter.

Figure 2:
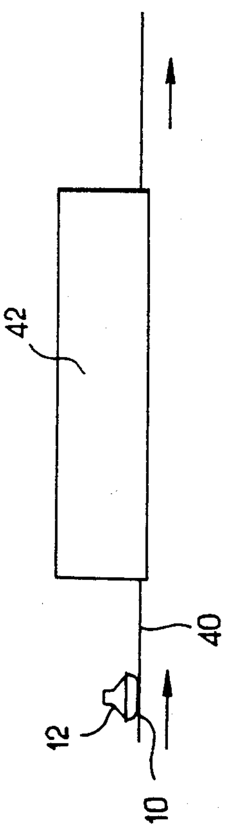
FIG. 2 shows diagrammatically a known curing installation which can be used for the assembly of a headlight according to the invention.

Once the member 28 has been put in place on the support element 12, gluing is performed in known manner. After the application of the glue, the two elements are assembled and retained provisionally if necessary by clips disposed opposite each of the supports. The two elements are then placed on a moving belt 40 which takes them through a drying tunnel 42 (see FIG. 2). In the drying operation the elements 12 and 10 are arranged so that the lens 10 is disposed below, so that under the influence of the temperature the element 12 tends to become deformed and applied fully to the lens 10.

In the second variant embodiment of the invention, the interposed support members all have an identical thickness h which is at a maximum value. These members are made from a thermoplastics material adapted to flow during the curing of the glue, so that of their own accord they assume a thickness corresponding to the offset d. The members are advantageously made of polyvinyl chloride (PV.C), selected to melt at a temperature 10° C. lower than the curing temperature of the glue. The support member is thus softened and flows under the influence of the weight of the support element 12 disposed above the lens, and therefore of its own accord reaches the required value.

In the third variant embodiment of the invention, the interposed support member is formed by a nipple moulded in one piece with the support element. The assembly of the headlight consists in first of all applying the lens to a mounting corresponding to the shape of the support element, as in the case of the first variant embodiment. Then the excess thickness of the nipple is measured, and it is brought to the required thickness.

The nipple can either be crushed ultasonically or by the application of a hot plate, or automatically machined. Once this operation has been completed, gluing is carried out in the manner disclosed hereinbefore.

Of course, the invention is not limited to the embodiments more particularly disclosed hereinbefore, and other variants may be adopted without exceeding the scope of the invention.

For instance, the number and location of the extra supports can be varied, and the support members themselves can take different forms.

The invention is more particularly applicable to motor vehicle headlights, more particularly large headlights.

What is claimed is:

1. A process for assembling a headlight comprising the steps of:

a. providing a glass lens element having three internal bearing supports cast in one piece with said lens each support having a top bearing surface defining together a common bearing plane, said glass lens being further provided with at least one further support which has a support surface which is offset from said bearing plane and said internal bearing supports;

b. providing a mating support element for said glass lens element;

c. placing said glass lens element on a mounting so that said glass lens element rests on said mounting by bearing on said top bearing surfaces of said three internal supports;

d. measuring the offset between the bearing plane defined by said internal bearing supports and the support surface of said further support;

e. providing a plurality of interposable support members of varying thicknesses;

f. selecting from said plurality of support members a member having a thickness corresponding to said offset;

g. assembling said headlight with said selected support member interposed between said support element and the support surface of said further support on said lens element.

2. A process according to claim 1, wherein said offset is measured by a potentiometric sensor.

* * * * *